June 17, 1930.    S. RAPHAEL    1,765,345
FASTENING DEVICE
Filed Aug. 19, 1927
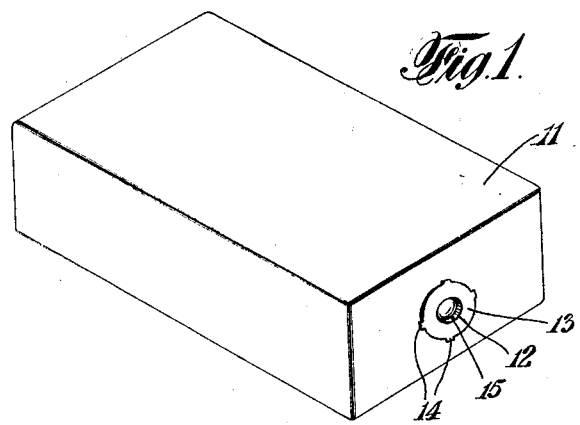
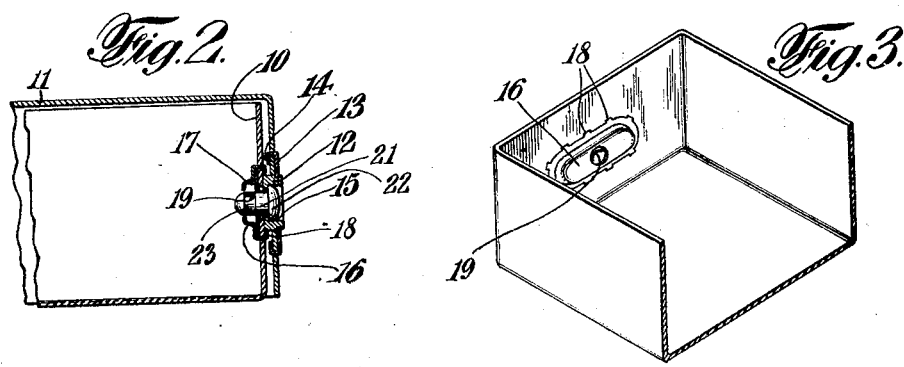
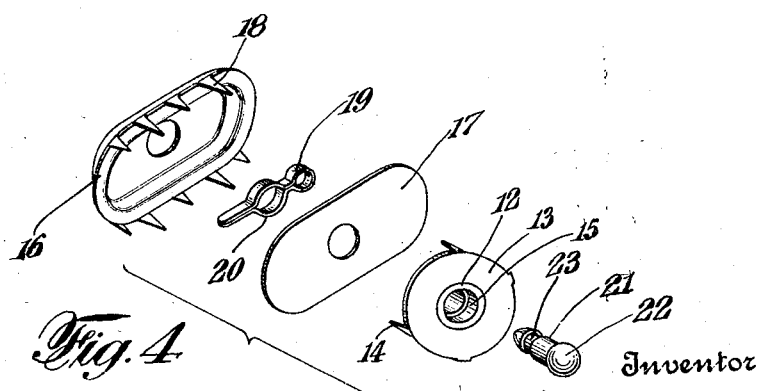

Patented June 17, 1930

1,765,345

UNITED STATES PATENT OFFICE

SYLVESTER RAPHAEL, OF BROOKLYN, NEW YORK, ASSIGNOR TO JUST RIGHT LOCK COMPANY, OF NEW YORK, N. Y., A CORPORATION OF NEW YORK

FASTENING DEVICE

Application filed August 19, 1927. Serial No. 214,001.

This invention relates to fastening devices and pertains more particularly to fastening devices that may be employed securely to seal packages, boxes or the like in such manner as to prevent the opening of the package or box without mutilation of the box or fastener.

An object of this invention is a fastening device which is easy to manipulate, efficient in operation, cheap to manufacture and of such construction that it may easily be applied to a receptacle or a container to be used to fasten a cover thereto.

Other objects, novel features and advantages of the invention will be apparent from the following specification and accompanying drawings, wherein Figure 1 is a perspective view of a box, the cover of which is attached by a fastening embodying the invention.

Figure 2 is a section through the fastening device as applied to a box.

Figure 3 is a perspective view of the interior of the box showing the fastener in place; and Figure 4 is an exploded view of the various parts of the fastening device.

Referring now to the drawings, the invention will be described as applied to a container 10 having a cover 11. The part of the fastening device applied to the cover comprises a tubular member 12 having a flange 13 on the periphery of which are provided teeth 14. The member 12 is arranged in an aperture provided in one wall of the cover 11 and the flange 13 contacts with the outer face of the wall. The member 12 and flange 13 are held in this position by means of the teeth 14 which pass through the wall 11 and are bent over in clamping position. The tubular member 12 projects slightly beyond the inner face of the cover wall and is countersunk to provide a socket 15.

The part of the fastener attached to the container 10 comprises a box-like member 16 closed by a plate 17, the member 16 and plate 17 having alined apertures. The member 17 is provided with teeth 18 certain of which are bent over the plate 17 to hold it against the member 16 and the others of which are used to fasten the member 16 to the wall of the container 10. A resilient member 19 is provided within the member 16 and consists of a strip of tempered metal bent intermediate its ends and having portions bowed outwardly intermediate the ends and the bend to provide an opening 20. The resilient member 19 is simply laid in the box-like member 16 and is free to move therein slightly. However, its movement is so limited that a portion of the opening 20 at all times overlaps the alined apertures in the members 16 and 17. An aperture is provided in the wall of the container in alinement with the apertures in the part of the fastener applied to the container wall.

When the cover is placed over the container the apertures in the tubular member 12, the plate 17 and member 16 are in alinement. The fastening members are locked together by a coupling pin 21 having a head 22 at one end and a groove 23 at the other end. The grooved end of the pin 21 is passed through the tubular member and the aperture in the plate 17 and engages the bowed portions of the resilient member 19, thereby bringing the opening defined by such bowed portions into alinement with the apertures in the members 17 and 16. Further movement of the pin 21 spreads the resilient member until the outer shoulder of the groove 23 has cleared the resilient member. The bowed portions 20 then spring into the groove 23, thereby preventing withdrawal of the pin 21. The head 22 is now seated in the socket 15 and being wholly contained within the tubular member 12 prevents getting hold of it with pliers or the like to remove it.

The fastening device above described securely locks together the cover and container and prevents removing the cover without mutilation of the package or the fastening device itself. The utilization of a resilient member which yields radially with respect to the axis of the coupling pin permits locking the pin in place without any backward movement of the pin after the resilient members have snapped into position. Moreover the extension of the tubular member 12 beyond the inner wall of the cover provides a protection against the insertion of a sharp tool between the cover and container. By having the head of the coupling pin arranged in a countersunk socket there is no way to get hold of the pin to pull it out of locking position.

Although the invention has been described with reference to a box adapted to be closed by a loose cover, it is of course apparent that the fastening member is not limited to such use but may be applied to many different types of packages. Furthermore it is understood that various changes may be made in the structure of the fastening device without in any way departing from the spirit of the invention as defined in the appended claims.

I claim:

1. A fastener of the character described comprising a tubular member having a countersunk recess at one end, a box-like member having an aperture in one wall, a coupling pin having a head at one end and a groove at the other end, said coupling pin having its head seated within said recess and its grooved end extending into said box-like member, a resilient detent in said box-like member, said detent being yieldable radially with respect to the axis of said pin and arranged within said groove, whereby said coupling pin is locked against movement.

2. A fastener of the character described comprising a tubular member having a countersunk recess, a plate having an aperture, a coupling pin passing through said tubular member and aperture, said pin having a head seated in said recess and means co-operating with said plate for locking said coupling pin.

In testimony whereof, I have signed my name to this specification.

SYLVESTER RAPHAEL.